(12) United States Patent
Boukaya et al.

(10) Patent No.: US 7,587,579 B2
(45) Date of Patent: Sep. 8, 2009

(54) PROCESSOR CORE INTERFACE FOR PROVIDING EXTERNAL HARDWARE MODULES WITH ACCESS TO REGISTERS OF THE CORE AND METHODS THEREOF

(75) Inventors: Michael Boukaya, Raanana (IL); Roy Glasner, Ramat Gan (IL); Eran Briman, Sunnyvale, CA (US)

(73) Assignee: Ceva D.S.P. Ltd., Herzlia Pituach (IL)

( * ) Notice: Subject to any disclaimer, the term of this patent is extended or adjusted under 35 U.S.C. 154(b) by 0 days.

(21) Appl. No.: 11/022,850

(22) Filed: Dec. 28, 2004

(65) Prior Publication Data
US 2006/0149936 A1 Jul. 6, 2006

(51) Int. Cl.
*G06F 9/00* (2006.01)
(52) U.S. Cl. ....................................................... 712/38
(58) Field of Classification Search .................... 712/34, 712/35, 220, 38; 700/2
See application file for complete search history.

(56) References Cited

U.S. PATENT DOCUMENTS 5,408,625 A * 4/1995 Narita et al. ................. 712/210
6,434,689 B2 * 8/2002 Fleck et al. .................... 712/34
6,832,117 B1 * 12/2004 Miyamori ....................... 700/2

OTHER PUBLICATIONS

Halfhill, Tom R., MIPS Embraces Configurable Technology: Pro Series Processors with CorExtend Compete With ARC and Tensilica, in MicroProcessor Report, Mar. 3, 2003, pp. 1-9 www.MPRonline.com.

Levy, Markus., "MIPS Pipeline Favors Synthesizability: Eight-Stage Pipeline Yields High Frequency", in MicroProcessor Report, Jun. 30, 2003, pp. 1-4 www.MPRonline.com.

Levy, Markus, "ARM Wrestles with MIPS: Comparing the ARM11 and MIPS 24K Microarchitectures", in MicroProcessor Report, Aug. 4, 2003, pp. 1-3 www.MPRonline.com.

Halfhill, Tom R., Motorola Enhances StarCore DSP: SC140E Core Offers New Instructions, Caches, and Task Protection, in MicroProcessor Report, Oct. 20, 2003, pp. 1-6 www.MPRonline.com.

Halfhill, Tom R., Floating Point Buoys ClearSpeed: Massively Parallel Processor Delivers 25.6 Peak GFLOPS at 200MHz, in MicroProcessor Report, Nov. 17, 2003, pp. 1-7 www.MPRonline.com.

Halfhill, Tom R., "Chartered Seeks Lucrative Customers", in MicroProcessor Report, Mar. 3, 2003, www.MPRonline.com.

Glaskowsky, Peter N., "Now This is a Horse Race", in MicroProcessor Report, Jun. 30, 2003, pp. 1-2 www.MPRonline.com.

(Continued)

*Primary Examiner*—David J Huisman
(74) *Attorney, Agent, or Firm*—Pearl Cohen Zedek Latzer, LLP

(57) ABSTRACT

A processor core architecture includes a cluster having at least a register file and predefined functional units having access to the register file. The architecture also includes an interface to one or more arbitrary functional units external to the processor core. The interface is to provide the arbitrary functional units with access to the register file.

16 Claims, 2 Drawing Sheets

OTHER PUBLICATIONS

Glaskowsky, Peter N., "Rambus Yellowstone Becomes XDR", in MicroProcessor Report, Aug. 4, 2003, www.MPRonline.com.

Levy, Markus, "MIPS Reveals 24K Core Family: New Synthesizable Cores Run at 550MHz", in MicroProcessor Report, Oct. 20, 2003, pp. 1-2 www.MPRonline.com.

Baron, Max, "Jupiter's Twin Cores: Advanced Technologies Converge in a Powerful Multipurpose Chip", in MicroProcessor Report, Nov. 17, 2003, pp. 1-6 www.MPRonline.com.

Alpert, Don, "Will Microprocessors Become Simpler?: Multithreading May Reverse the Trend Toward Increasing Processor Complexity", in MicroProcessor Report, Nov. 17, 2003, pp. 1-4 www.MPRonline.com.

Levy, Markus, "ARM Gets More Deeply Embedded: ARM1156T2-S Adds a Pipeline Stage and Grows More Tolerant of Faults", in MicroProcessor Report, Oct. 20, 2003, pp. 1-3 www.MPRonline.com.

* cited by examiner

PROCESSOR CORE INTERFACE FOR PROVIDING EXTERNAL HARDWARE MODULES WITH ACCESS TO REGISTERS OF THE CORE AND METHODS THEREOF

BACKGROUND OF THE INVENTION

A processor implemented in an integrated circuit (IC) may include a processor core having a native architecture. The processor core has an instruction set, and each instruction in the set has a predefined latency that determines how many stages of the processor core's pipeline are involved in the execution of the instruction.

If the instruction set does not include an instruction for a particular operation, then executing that particular operation will require the execution of two or more instructions. Consequently, software involving that operation will run slower than it would if that operation was included in the native architecture.

In order to "accelerate" the particular operation, or to execute functions that the processor core cannot perform, a dedicated hardware accelerator may be designed and implemented in the integrated circuit. In general, there is some overhead involved in using the accelerator. For example, the use of the accelerator may involve setting modes, configuring the accelerator, and creating triggers. In another example, the accelerator typically writes either to internal registers of the accelerator or to shared memory. The processor core must then read from the shared memory to access the results of the operations performed by the accelerator. The overhead may diminish the benefits of using the accelerator.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Figure 1:
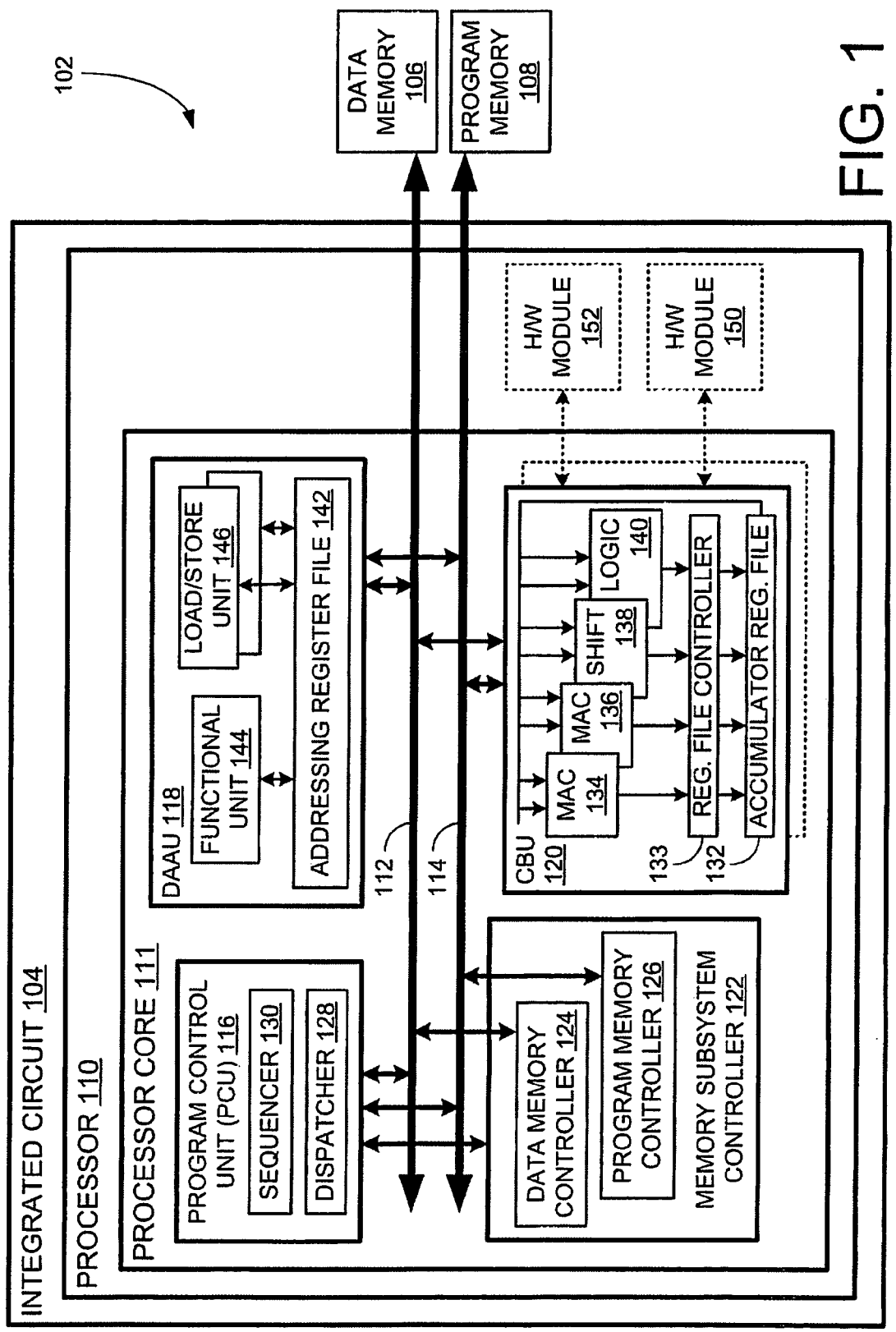
FIG. 1 is a simplified block diagram of an exemplary device including a processor coupled to a data memory and to a program memory, according to some embodiments of the invention.

FIG. 1 is a simplified block diagram of an exemplary apparatus 102 including an integrated circuit 104, a data memory 106 and a program memory 108. Integrated circuit 104 includes an exemplary processor 110 that may be, for example, a digital signal processor (DSP), and processor 110 is coupled to data memory 106 via a data memory bus 112 and to program memory 108 via a program memory bus 114. Data memory 106 and program memory 108 may be the same memory or alternatively, separate memories.

An exemplary architecture for a processor core 111 of processor 110 will now be described, although other architectures are also possible. Processor core 111 includes a program control unit (PCU) 116, a data address and arithmetic unit (DAAU) 118, one or more computation and bit-manipulation units (CBU) 120, and a memory subsystem controller 122. Memory subsystem controller 122 includes a data memory controller 124 coupled to data memory bus 112 and a program memory controller 126 coupled to program memory bus 114. PCU 116 includes a dispatcher 128 to pre-decode and dispatch machine language instructions and a sequencer 130 that is responsible for retrieving the instructions and for the correct program flow.

CBU 120 includes an accumulator register file 132, a register file controller 133, and functional units 134, 136, 138 and 140, having any of the following functionalities or combinations thereof: multiply-accumulate (MAC), add/subtract, bit manipulation, arithmetic logic, and general operations. In the example shown in FIG. 1, functional units 134 and 136 have at least MAC functionality, functional unit 138 has at least shift functionality and functional unit 140 has at least arithmetic logic functionality.

The inputs and outputs of functional units 134, 136, 138 and 140 are coupled to accumulator register file 132. (In other embodiments, functional units 134, 136, 138 and 140 may have fixed input registers and/or fixed output registers.). For example, each of functional units 134, 136, 138 and 140 may have two inputs and may be able to receive two operands at the same time from accumulator register file 132, and may have one output to submit results to accumulator register file 132. Each CBU 120 is denoted a "cluster". The functional units of the cluster are predefined as part of the architecture of processor core 111.

DAAU 118 includes an addressing register file 142, a functional unit 144 having arithmetic, logical and shift functionality, and load/store units (LSU) 146 capable of loading and storing data chunks from/to data memory 106.

According to embodiments of the invention, processor 110 may include one or more external hardware modules that are external to processor core 111 and are not included in the native architecture of processor core 111. Each external hardware module is an arbitrary functional unit in the sense that it is not predefined by the designers of the processor core architecture and its functionality is not necessarily related to the functional units in the processor core or to the other hardware modules.

An external hardware module is coupled to a particular cluster of processor core 111. Processor core 111 includes an interface to the external hardware module that provides the external hardware module with access to the register file of the cluster to which it is coupled. Although not shown explicitly in FIG. 1, any or all of the external hardware modules may access a shared or dedicated memory or both.

According to one embodiment of the invention, each cluster may have at most two external hardware modules coupled thereto. In the example shown in FIG. 1, external hardware modules 150 and 152 are coupled to one cluster. External hardware module 152 is coupled with functional units 134 and 138, as explained in further detail hereinbelow with respect to FIG. 2, and two instructions may be executed in parallel by at most two of external hardware module 152, functional unit 134 and functional unit 138. External hardware module 150 is coupled with functional units 136 and 140, and two instructions may be executed in parallel by at most two of external hardware module 150, functional unit 136 and functional unit 140.

The instruction format for processor 110 has predefined bits to identify the instruction as an instruction for a particular external hardware module. The predefined bits also designate which of the two predefined functional units coupled to the external hardware module is to control access of to the register file of the cluster by the external hardware module during execution of the instruction. The bits of the instruction format other than the predefined bits are to be defined by a designer of processor 110. The designer of processor 110 may therefore create new instructions that activate the external hardware modules. The syntax and encoding of such instructions may be customized and defined according to the needs of the application and architecture guidelines.

An assembler tool may be developed for processor core 111. The designer of processor 110 may develop a plug-in to the assembler tool that has definitions of the new instructions. This plug-in may recognize the syntax of the new instructions, check its validity, and translate the syntax into valid instructions of processor core 111. This plug-in may also automatically specify the latency of new instructions to be executed in synchronous mode.

According to some embodiments of the invention, from the perspective of users of the processor, the external hardware modules are treated in much the same way as functional units belonging to the native architecture of the processor core. Software programmers may write assembly language instructions that are translated by an assembler tool into instructions belonging to the instruction set of the processor or into new instructions of the external hardware modules. Instructions to be executed in parallel by the various functional units of the processor (including the external hardware modules) may be combined in an instruction packet for joint handling by PCU 116.

Each instruction in the instruction packet may have its own condition, so that each instruction is executed or not independently of the other instructions in the instruction packet.

Figure 2:
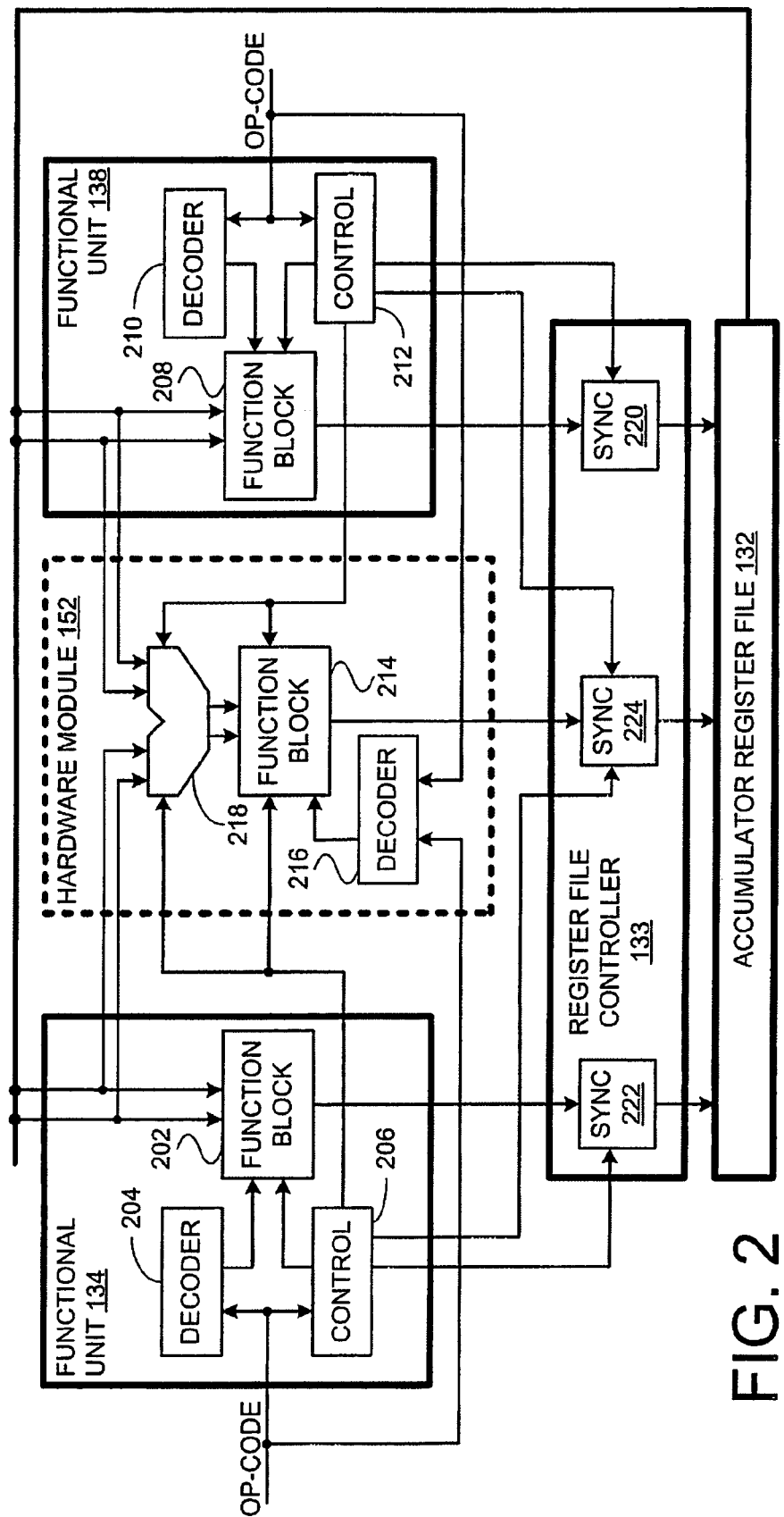
FIG. 2 is a simplified block diagram of an exemplary interface of a processor core to an external hardware module, according to some embodiments of the invention.

FIG. 2 is a simplified block diagram of accumulator register file 132, register file controller 133, functional units 134 and 138, all belonging to a cluster of processor core 111, and external hardware module 152. FIG. 2 shows an exemplary interface of processor core 111 to external hardware modules, according to some embodiments of the invention.

Functional unit 134 includes a function block 202 to execute an operation, a decoder 204 to decode an encoded version of the operation, and control circuitry 206. Function block 202 is coupled to decoder 204 and to control circuitry 206. Control circuitry 206 determines from the encoded version of the operation which registers of accumulator register file 132 are operands of the operation, and which register of accumulator register file 132 is to store the result of the operation. In the example where functional unit 134 includes at least MAC functionality, function block 202 includes at least MAC functionality.

Similarly, functional unit 138 includes a function block 208, a decoder 210 and control circuitry 212. Function block 208 is coupled to decoder 210 and to control circuitry 212. In the example where functional unit 138 includes at least shift functionality, function block 208 includes at least shift functionality.

External hardware module 152 includes a function block 214 to execute operations, a decoder 216 to decode encoded versions of the operations, and a multiplexer 218.

Functional units 134 and 138 each have a bandwidth of two source accumulators and one destination accumulator. Similarly, external hardware module 152 has a bandwidth of two source accumulators and one destination accumulator.

Register file controller 133 includes synchronization blocks 220, 222 and 224 to receive results of operations from function blocks 208, 202 and 214, respectively, and to write the results into accumulator register file 132.

Dispatcher 128 (FIG. 1) may receive an instruction packet that includes an instruction for external hardware module 152. Dispatcher 128 may pre-decode the instruction packet and the instruction and may determine which of functional units 134 and 138 is to control the access of external hardware module 152 to accumulator register file 132.

In the event that functional unit 134 is to control the access of external hardware module 152, dispatcher 128 may send an encoded version of the operation (denoted an "op-code") to external hardware module 152 and to functional unit 134. Since external hardware module 152 receives the op-code directly from dispatcher 128, decoder 216 may decode the op-code at the same pipeline stage as the decoders of functional units internal to processor core 111. Decoder 216 may then instruct function block 214 to execute the operation. Control circuitry 206 may fetch the operands of the operation from accumulator register file 132 and control the timing of the receipt of the operands by function block 214 via multiplexer 218. Control circuitry 206 may determine from the op-code to which register of accumulator register file 132 to write a result of the operation. Control circuitry 206 may also control the timing of writing of the result by synchronization block 224.

Similarly, in the event that functional unit 138 is to control the access of external hardware module 152, dispatcher 128 may send an encoded version of the operation (denoted an "op-code") to external hardware module 152 and to functional unit 138. Decoder 216 may decode the op-code and instruct function block 214 to execute the operation. Control circuitry 212 may control the timing of the receipt of the operands of the operation by function block 214 via multiplexer 218. Control circuitry 212 may determine from the op-code to which register of accumulator register file 132 to write a result of the operation. Control circuitry 212 may also control the timing of writing of the result by synchronization block 224.

The external hardware module may operate in a synchronous mode or a trigger (asynchronous) mode.

In the synchronous mode, the instruction specifies a destination that is a register in accumulator register file 132. At a specified pipeline stage, as decoded by decoder 216, the control circuitry of the functional unit that is controlling the access to accumulator register file 132 by external hardware module 152 will cause synchronization block 224 to write its contents to the specified register. Execution of the instruction by function block 214 is not necessarily synchronized with the pipeline of processor core 111. However, the result of function block 214 must be ready and valid at the predefined pipeline stage for proper functionality. In some embodiments, the instruction will specify its latency, namely, in which pipeline stage the result of the operation will be ready and valid.

An example of an instruction in the synchronous mode is as follows:

ext1.gmul a0, a1, a2

Dispatcher 128 identifies the instruction as an instruction for external hardware module 152, and decoder 216 decodes the instruction as a "gmul" instruction. The result of the calculation is written to the destination at the pipeline stage specified in the instruction set data base extension.

The asynchronous mode is suitable for instructions that require more than the number of predefined execution stages of processor core 111 to complete their operation, or for instructions that are simply asynchronous (for example, instructions for an external hardware module that use independent memory access that may contain wait states). The destination of such an instruction, if any, is an internal register (not shown) of the external hardware module, and the execution of the instruction by function block 214 is not necessarily synchronized with the pipeline of processor core 111. For processor core 111 to have access to the result of the operation, the result is explicitly written to processor core 111 using a separate, synchronous move-type instruction. The explicit move instruction may be issued once the operation performed by the external hardware module is complete. An indication that the operation is complete may be issued in one of the following ways:

a) insertion of an interrupt by the external hardware module when the operation is completed;
b) polling by the processor core on the user input pins of the external hardware module;
c) if the precise number of cycles needed to complete the operation is known, no polling is needed and a synchronous move-type instruction may be issued when the operation is assumed to have completed.

An example of an indication based on insertion of an interrupt is as follows:

```
ext1.mpg4 a0, a1, ea3    ; ea3 is an internal register of the ext. h/w module
...                      ; as soon as the operation is done,
...                      ; the interrupt int0 is inserted
...
int0_service:
    ext1.mov ea3, a5     ; when the operation is done, int0 is asserted
    reti                 ; and the result may be copied from ea3 to a5
                         ; using a synchronous move instruction
```

An example of an indication using polling is as follows:

```
ext1.mpg4 a0, a1, ea3    ; ea3 is an internal register of the ext. h/w module
...
poll_loop:
    flcopy ui0, pra0     ; copy user-input 0 to pra0 predicate register
    nop
    br poll_loop , ?pra0 ; branch back to polling loop
    ext1.mov ea3, a5     ; copy ea3 to a5 in case pra0 is false
    ...                  ; and continue with program flow
```

An example where the number of cycles to perform the operation is known is as follows:

```
ext1.mpg4 a0, a1, ea3    ; ea3 is an internal register of the ext. h/w module
inst1
inst2
inst3
ext1.mov ea3, a5         ; operation is assumed to be completed in 4 cycles.
                         ; so copy the result after 3 instructions
```

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A method comprising:
   providing a processor core architecture having a register file and predefined first and second computation and bit-manipulation functional units having access to said register file; and
   providing an arbitrary functional unit external to said processor core architecture and coupled to said first and second functional units, said arbitrary functional unit having access to said register file;
   receiving an instruction packet that includes an instruction for said arbitrary functional unit;
   selecting based on data within the instruction packet which of the first and second computation and bit-manipulation functional units is to control the access of the arbitrary functional unit to the register file;
   executing the instruction by the arbitrary functional unit and controlling, by the first computation and bit-manipulation functional unit, writing a result of the execution in the register file when the first computation and bit-manipulation functional unit is selected; and
   executing the instruction by the arbitrary functional unit and controlling, by the second computation and bit-manipulation functional unit, writing a result of the execution in the register file when the second computation and bit-manipulation functional unit is selected.

2. The method of claim 1, wherein said predefined functional units are able to control when, and to which register of said register file, said arbitrary functional unit is to have said access.

3. The method of claim 1, wherein receiving the instruction packet that includes the instruction for said arbitrary functional unit comprises:
   providing an instruction format having predefined bits to designate that the instruction is to be executed by said arbitrary functional unit and to designate which of said predefined functional units is to control said access to said register file by said arbitrary functional unit during execution of said instruction.

4. The method of claim 3, wherein bits of said instruction format other than said predefined bits are to be defined by a designer of a processor involving said processor core architecture.

5. The method of claim 4, wherein said processor core architecture has a pipeline, and said bits to be defined by said designer include bits that determine how many stages of said pipeline are to be used in execution of said instruction.

6. The method of claim 1, wherein the first, second and arbitrary functional units execute at most two instructions in parallel.

7. A processor comprising:
a processor core architecture having a register file and predefined first and second computation and bit-manipulation functional units having access to said register file; and
an arbitrary functional unit external to said processor core and coupled to said first and second functional units, said arbitrary functional unit having access to said register file,
wherein said processor core comprises a dispatcher to select based on data within an instruction packet that includes an instruction for said arbitrary functional unit, which of the first and second computation and bit-manipulation functional units is to control the access of the arbitrary functional unit to the register file,
wherein writing in the register file a result of an execution of the instruction by the arbitrary unit is being controlled by the first computation and bit-manipulation functional unit, when the first computation and bit-manipulation functional unit is selected and by the second computation and bit-manipulation functional unit, when the second computation and bit-manipulation functional unit is selected.

8. The processor of claim 7 comprising:
a register file controller coupled to said register file and including a synchronization block for the arbitrary functional unit external to said processor core, where said synchronization block is to receive results of operations from a function block of said arbitrary functional unit and to write said results into said register file.

9. The processor of claim 8, wherein the first predefined functional unit comprises:
first control circuitry to determine, from an encoded version of an operation, to which register of said register file to write a result of said operation, said first control circuitry also able to fetch operands of said operation from said register file and to control timing of receipt of said operands by said function block and timing of writing of said result by said synchronization block.

10. The processor of claim 9, wherein said register file is an accumulator register file.

11. The processor of claim 7, wherein said processor core architecture has a pipeline, and an instruction to be executed by said arbitrary functional unit includes an indication of how many stages of said pipeline are to be used in execution of said instruction.

12. The processor of claim 7, wherein the first, second and arbitrary functional units execute at most two instructions in parallel.

13. The processor of claim 12, wherein said first predefined functional unit further includes a predefined function block, and said control circuitry is to control timing of receipt of operands by said predefined function block and timing of writing of a result from said predefined function block to a register of said register file.

14. The processor of claim 12, wherein the second predefined functional unit comprises:
second control circuitry to determine, from an encoded version of another operation, to which register of said register file to write a result of said other operation, said second control circuitry also able to fetch operands of said other operation from said register file and to control timing of receipt of said operands of said other operation by said function block and timing of writing of said result of said other operation by said synchronization block.

15. The processor of claim 14, wherein the dispatcher is to dispatch an encoded version of a particular operation either to said first predefined functional unit or to said second predefined functional unit.

16. The processor of claim 15, wherein said dispatcher is also to dispatch said encoded version of said particular operation to said arbitrary functional unit.

* * * * *